Aug. 29, 1944. F. T. HARRINGTON ET AL 2,357,107
POWER TRANSMISSION
Filed Oct. 12, 1938    2 Sheets-Sheet 1

INVENTORS
FERRIS T. HARRINGTON
& RAYMOND C. GRIFFITH
BY
Ralph L. Tweedale
ATTORNEY

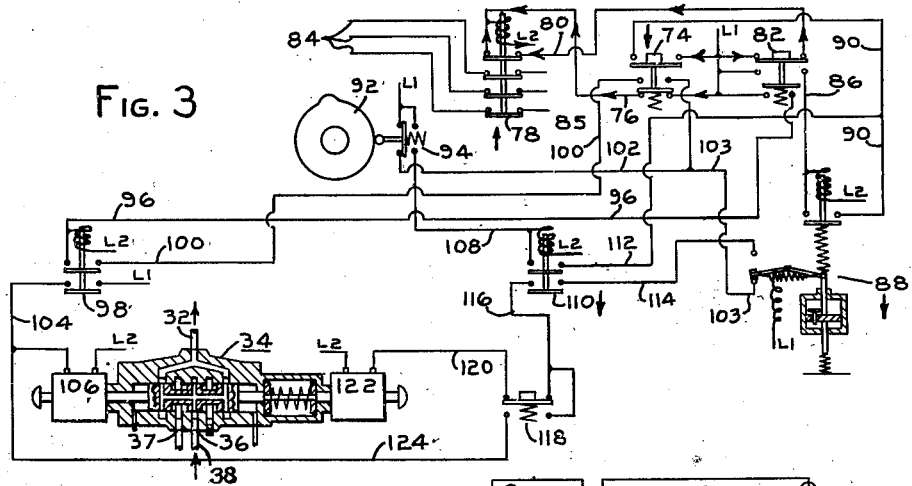
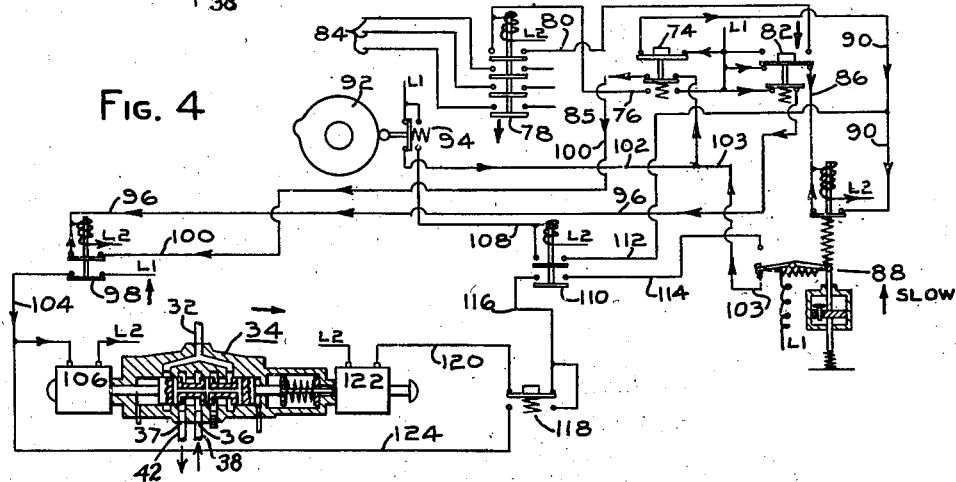
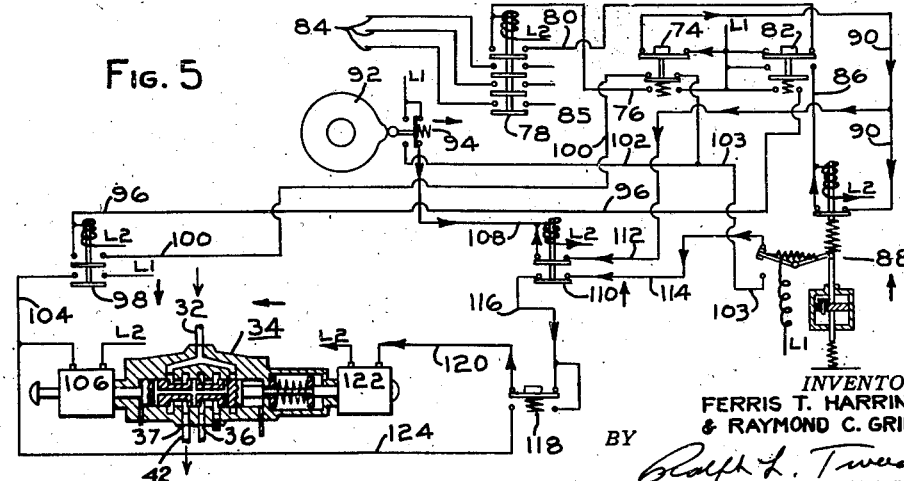

Patented Aug. 29, 1944

2,357,107

UNITED STATES PATENT OFFICE 2,357,107

POWER TRANSMISSION

Ferris T. Harrington and Raymond C. Griffith, Detroit, Mich., assignors to Vickers Incorporated, Detroit, Mich., a corporation of Michigan Application October 12, 1938, Serial No. 234,634

9 Claims. (Cl. 60—53)

This invention relates to power transmissions, particularly to those of the type comprising two or more fluid pressure energy translating devices one of which may function as a pump and another as a fluid motor.

The invention is particularly concerned with a power transmission system of this character wherein one of the energy translating devices is connected to a load device having an independent prime mover drive and wherein the power transmission may be utilized both for braking the load device and for driving the same while the prime mover is de-energized.

It is an object of the present invention to provide a control means whereby a load device may be slowed down to an adjustable slow speed and then automatically brought to a stop at a predetermined position.

It is also an object to provide selectively operable means for operating the load device at slow speed independently of its normal drive and for stopping the load device in a predetermined position.

Further objects and advantages of the present invention will be apparent from the following description, reference being had to the accompanying drawings wherein a preferred form of the present invention is clearly shown.

In the drawings:

Figures 3, 4 and 5 are diagrammatic views of the electric circuit of Figure 1 showing the parts in different stages of an operating cycle.

Figure 1:
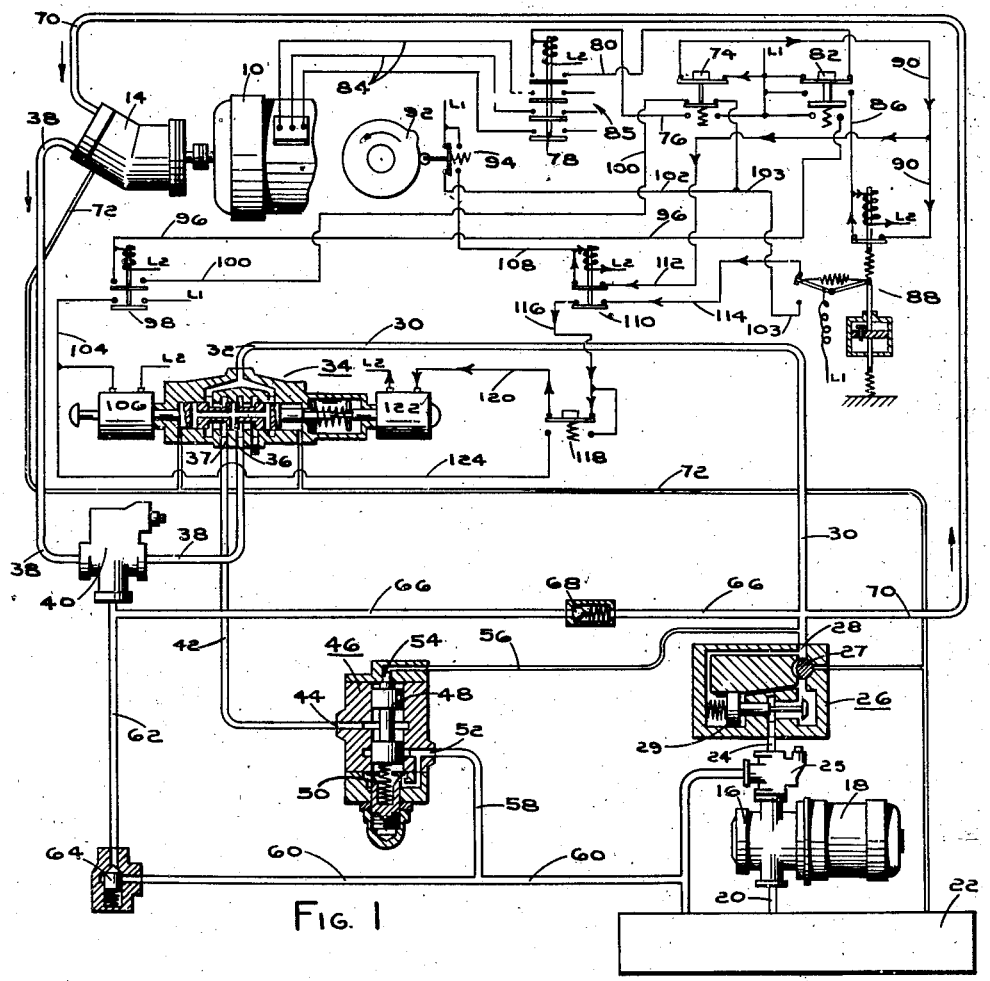
Figure 1 represents a diagrammatic view of a power transmission system incorporating a preferred form of the present invention.
Figure 2:
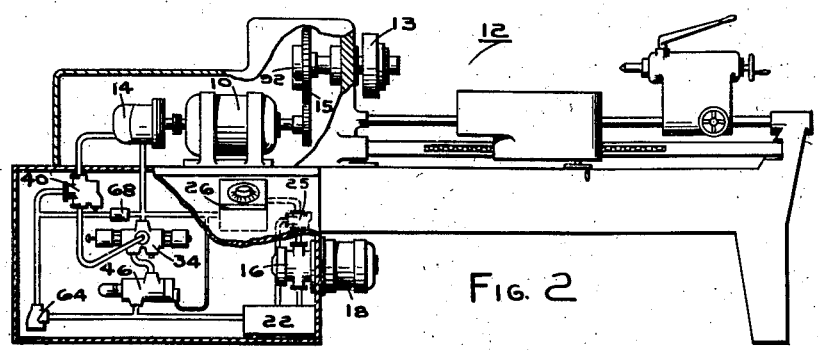
Figure 2 represents a partially diagrammatic view of a lathe incorporating the power transmission system shown in Figure 1.

A prime mover such as an electric motor 10 is adapted to drive a chuck 13 on a lathe 12 through gearing 15. Operatively connected to the electric motor 10 is a fluid pressure energy translating device 14, operable at different times as a motor or a pump and hereinafter referred to as unit 14. The unit 14 may be of any suitable construction and by way of example may be constructed similarly to that shown in Patent No. 1,931,969 to Hans Thoma.

Means for the effective operation of the unit 14 are provided as follows:

A pump 16, which may be of the fixed displacement type and continuously driven by a suitable prime mover such as an electric motor 18, has a suction conduit 20 through which fluid may be withdrawn from a tank 22. The pump 16 delivers fluid through a relief valve 25 and conduit 24 to a hydrostatic flow control valve 26. The latter has an adjustable throttle 27, a discharge port 28, and a pressure regulating valve 29 and is operable to maintain a constant but adjustable rate of flow therethrough in a manner well known in the art. The port 28 of valve 26 is connected by a conduit 30 to a port 32 of a solenoid-operated, spring-centered, open-center, three-way valve 34 which has delivery ports 36 and 37.

The port 36 is connected by a conduit 38 to the unit 14. A relief valve 40 is interposed in conduit 38. A conduit 42 extends from the port 37 of valve 34 to a port 44 of a pressure responsive resistance valve 46. The valve 46 has a spool 48 which is normally held in its uppermost position by a spring 50, accordingly closing port 44 from a discharge port 52. A small piston 54 is subject to pressure in conduit 30 through a conduit 56. When the pressure in conduit 30 rises above the setting of the spring 50 the piston 54 will push the spool 48 downwardly thereby connecting ports 44 and 52. The port 52 is connected to tank 22 by a conduit 58 and a conduit 60.

The relief valve 40 has a discharge conduit 62 extending to a check valve 64 which is connected to tank 22 by conduit 60. Connecting conduits 30 and 62 is a conduit 66 with a check valve 68 placed therein. A conduit 70 extends from conduit 30 to the other side of unit 14. A conduit 72 is provided to drain the unit 14, valve 34, and valve 26.

For the purpose of controlling the electric motor 10 and the solenoids of valve 34 an electric circuit is provided as follows:

A three-circuit push button starting switch 74 connects one side of the line $L^1$ through its normally open lower circuit by a conductor 76 to the operating coil of a holding relay 78, thence to line $L^2$. It will be understood that $L^1$ and $L^2$ are connected to opposite sides of a suitable electric power supply and that, to avoid confusion in the drawing, the various parts of the circuit which connect to the power source are merely designated as $L^1$ and $L^2$ respectively. The upper circuit of the relay 78 connects its operating coil to a conductor 80 which extends to the normally closed upper circuit of a triple-circuit push button stop switch 82 and from there to the line $L^1$ thus forming its own holding circuit. The relay 78 is adapted to connect a circuit 84 of the electric motor 10 to power lines 85. The normally open middle circuit of switch 82 connects line $L^1$ by a conductor 86 to the operating coil of a time delay relay 88, thence to line $L^2$. The upper circuit of relay 88 connects its operating coil to a conductor 90, which extends to the upper circuit of switch 74 and from there to line L¹, thus forming its own holding circuit. The lower circuit of relay 88 is a snap-acting, double throw switch.

A cam 92, driven at the same speed as the chuck 13, is adapted to depress a two circuit limit switch 94 once per revolution of the chuck. A conductor 96 extends from the normally-open lower circuit of switch 82 to the operating coil of a relay 98, thence to line L². The upper circuit of relay 98 connects its operating coil to a conductor 100, leading to the middle contacts of switch 74, and thence by a conductor 102 to the normally closed left hand circuit of limit switch 94, and by a parallel circuit through conductor 103 to the lower circuit of relay 88 and line L¹. Thus a holding circuit, which is effective either when the cam 92 is not depressing switch 94 or when the time delay relay 88 has not shifted upwardly, is provided for relay 98. The lower circuit of relay 98 connects the line L¹ to a conductor 104 which extends to a solenoid 106 of three-way valve 34, thence to line L². The normally open right hand circuit of limit switch 94 connects the line L¹ to a conductor 108 which extends to the operating coil of a relay 110, thence to line L². The upper circuit of relay 110 connects its operating coil to a conductor 112 which extends to conductor 90. Thus a holding circuit for relay 110 is formed. The lower circuit of the relay 110 extends from the line L¹ through the lower circuit of relay 88 to a conductor 114 which leads to the lower contacts of relay 110 and from there a conductor 116 extends to the two circuits of a push button switch 118. The normally closed upper circuit of switch 118 extends by a conductor 120 to a solenoid 122 of the three-way valve 34. The normally open lower circuit of the switch 118 extends by a conductor 124 to the conductor 104 and then to the solenoid 106 of the valve 34.

To start the machine from its stopped condition shown in Figure 1 the push button switch 74 is momentarily depressed (as shown in Fig. 3) thereby breaking the holding circuit 90 of time delay relay 88 and the holding circuit consisting of conductors 90 and 112 of relay 110. The breaking of the holding circuit for relay 88 permits the spring to operate the switch of the lower circuit thereof to open the circuit to solenoid 122 and connect the switch to conductor 103, and the circuit to the solenoid is further broken at relay 110 by breaking its holding circuit. As shown in Figure 3, accordingly the solenoid 122 is de-energized allowing the spool of valve 34 to center itself by its centering spring.

The lower circuit of switch 74 (as shown in Fig. 3) connects the line L¹ to the coil of relay 78 by conductor 76 thereby energizing the same. As the relay 78 closes, the conductors 84 are connected to the power lines 85, starting the electric motor 10. The holding circuit 80, which is closed at switch 82, holds the relay 78 closed to keep the electric motor 10 operating thereafter.

With the electric motor 10 running at full speed and neither solenoid 106 or 122 of valve 34 energized the unit 14 will act as a pump. Fluid will circulate with negligible resistance from unit 14 through conduit 38, port 36 of valve 34, through the open-center spool of the latter to port 32 and from there by conduits 30 and 70 back to the unit 14. This closed circuit is kept supercharged or under pressure by supply from pump 16 through flow control valve 26 at a pressure determined by relief valve 25.

To stop the machine the push button switch 82 is momentarily depressed (see Fig. 4), breaking the holding circuit 80 of relay 78. Accordingly relay 78 opens and shuts off the power to the electric motor 10. Also the coil of relay 98 is energized from the line L¹, switch 82, conductor 96 to the line L². The holding circuit of relay 98 is established by conductor 100, switch 74, conductor 103 and the time delay relay 88 to line L¹. A branch of this circuit is also closed through conductor 102 and switch 94 to line L¹. The controlled circuit of relay 98, connecting the line L¹ to conductor 104, thereby energizes solenoid 106 of valve 34 and causes the spool of the latter to shift to the right.

When the switch 82 was depressed it also made the circuit extending from line L¹ by conductor 86 to the coil of time delay relay 88, thence to line L². The holding circuit of time delay relay 88 is established at once and extends from its operating coil by conductor 90 and switch 74 to connect to line L¹. The snap-acting switch of relay 88, however, does not shift until a predetermined interval has elapsed, sufficient to permit the necessary deceleration of the motor 10.

When the spool of valve 34 shifted to the right, conduit 30 was blocked at port 32 and port 36 was opened to port 37 thereby directing the delivery from unit 14 through conduit 42 to port 44 of valve 46. Due to the suction in conduits 70 and 56 caused by the unit 14 drawing more fluid than is delivered by pump 16 through conduits 30 and 70, the spool 48 of valve 46 will close and block conduit 42 at port 44. Thus a back pressure is produced on unit 14 that is determined by the setting of relief valve 40. This back pressure causes the unit 14 to act as a brake for the electric motor 10. Fluid is bypassed over valve 40 and is drawn through valve 68 in conduit 66 and conduit 70 to unit 14 until the speed of the electric motor is reduced to the point where the fluid delivered from port 28 of the flow control valve 26 will again produce pressure in conduits 70 and 56. When the pressure in conduit 56 rises to the point where it will overcome the bias of spring 50 in valve 46 the small piston 54 will move the spool 48 downwardly, connecting port 44 to port 52. Conduit 38 is now connected to tank through ports 36 and 37 of valve 34, conduit 42, ports 44 and 52 of valve 46, conduit 58 and conduit 60. Accordingly the fluid delivered by pump 16 through conduit 70 will now actuate the unit 14 as a motor to drive the electric motor at a slow rate of speed determined by the setting of the throttle 27 of valve 26.

The unit 14 will thus continue to drive the electric motor at slow speed so long as the snap action of relay 88 is delayed and thereafter until the cam 92 next depresses the limit switch 94 (see Fig. 5). This opens the holding circuit of relay 98, the branch through 103 and relay 88 having been previously opened. This opens the circuit 104. Solenoid 106 of valve 34 therefore is de-energized, which allows its spool to spring center. The switch 94 also makes a circuit extending from the line L¹ and conductor 108 to the operating coil of relay 110, thence to line L². In the meantime the controlled circuit of time delay relay 88 has closed and connected the line L¹ by the conductor 114 to the relay 110 which is now closed. The solenoid 122 now being energized the spool of valve 34 shifts to the left.

With the spool of valve 34 in its left hand position ports 32 and 37 are connected. Conduit 38 is blocked at port 36 of valve 34 so that exhaust fluid from unit 14 must bypass over relief valve 40, through conduit 62, check valve 64, and conduit 60 to tank. The back pressure on the unit 14 caused by the fluid bypassing over relief valve 40 stops the unit 14 and the electric motor 10 substantially instantaneously. Sufficient rotation does occur, however, to carry the lobe of cam 92 out from under the switch 94 to its Figure 1 position. The delivery of pump 16 passes through flow control valve 26, conduit 30, valve 34, and conduit 42 to port 44 of valve 46. The spool of valve 46 being in its lowermost position port 44 is connected to port 52. Accordingly pressure fluid in conduit 42 passes through valve 46, conduit 58 and conduit 60 to tank.

Although the machine has come to a stop at a predetermined position, in response to cam 92 depressing switch 94, it may be desirable to further adjust the position of the lathe chuck 13. The switch 118 is provided for this purpose and when depressed will energize solenoid 106 to again cause unit 14 to act as a motor to drive the electric motor 10 at slow speed so long as the switch 118 is held down.

When switch 118 is released the solenoid 106 is deenergized and solenoid 122 becomes energized again and stops the unit 14 as described previously.

In order to accomplish the above operation certain relationships between the settings of the three pressure responsive valves 26, 40, and 46 should be maintained. Thus the valve 40 should be set at a maximum pressure, as this is used for decelerating and braking fluid motor 14. The valve 26 should be set for some intermediate pressure sufficiently high to supply the torque necessary to drive fluid motor 14 at the inching speed and at the same time overcome the back pressure from the outlet of fluid motor 14 set up by the resistance of valve 40. Valve 46, in turn, should be set at the lowest pressure of the three. The check valve 64 serves merely to create a slight back pressure in line 62 during the braking phase of the cycle, which pressure need only be sufficient to insure opening of the check valve 68 and thus prevent cavitation in line 70.

While the form of embodiment of the invention as herein disclosed constitutes a preferred form, it is to be understood that other forms might be adopted, all coming within the scope of the claims which follow.

What is claimed is as follows:

1. In a fluid power transmission system the combination of a prime mover operatively connected to a load device, a fluid pressure energy translating device operatively connected to the load device, pump means forming a source of pressure fluid, conduit means connecting the source and the said translating device, and valve means for controlling the effective paths and directions taken by the fluid to cause the translating device at times to be driven by the prime mover and at other times to drive the prime mover by fluid supplied from the source.

2. In a fluid power transmission system the combination of a prime mover operatively connected to a load device, a fluid pressure energy translating device operatively connected to the load device, pump means forming a source of pressure fluid, conduit means connecting the source and the said translating device, and means for causing the said device at times to be driven by the prime mover to act as a pump and at other times to act as a motor and drive the prime mover by fluid supplied from the source.

3. In a fluid power transmission system the combination of a prime mover operatively connected to a load device, a fluid pressure energy translating device operatively connected to the load device, pump means forming a source of pressure fluid, conduit means connecting the source and the said translating device, and means for causing the said device selectively to be driven by the prime mover and act as a pump, to act as a motor and drive the prime mover by fluid supplied from the source, and to brake the prime mover.

4. In a fluid power transmission system the combination of a prime mover operatively connected to a load device, a fluid pressure energy translating device operatively connected to the load device, pump means forming a source of pressure fluid, conduit means connecting the source and the said translating device, means for starting the prime mover, and means to shut off the supply of power to the prime mover, means operable concurrently with the last said means to cause the translating device to act as a motor and drive the prime mover at a predetermined slow speed by fluid delivered from the pump.

5. In a fluid power transmission system the combination of a prime mover operatively connected to a load device, a fluid pressure energy translating device operatively connected to the load device, pump means forming a source of pressure fluid, conduit means connecting the source in driving relation to the said translating device, means for rendering the prime mover ineffective to drive the load device, position responsive means for controlling the flow of fluid in said conduit means to cause the load device to stop at a predetermined position, and time delay means for temporarily disabling the position responsive means.

6. In a fluid power transmission system the combination of a prime mover operatively connected to a load device, a fluid pressure energy translating device operatively connected to the load device, pump means forming a source of pressure fluid, conduit means connecting the source in driving relation to the said translating device, means for starting and stopping the prime mover, means for causing the pump and translating device to bring the load device to a predetermined slow speed, position responsive means for controlling the flow of fluid in said conduit means to cause the load device to stop at a predetermined position, and means for rendering the position responsive means operative only when the load device is operating at slow speed.

7. In a fluid power transmission system the combination of a prime mover operatively connected to a load device, a fluid pressure energy translating device operatively connected to the load device, pump means forming a source of pressure fluid, conduit means connecting the source in driving relation to the said translating device, means for starting and stopping the prime mover, means for causing the pump and translating device to automatically bring the load device to a predetermined slow speed, position responsive means for controlling the flow of fluid in said conduit means to cause the load device to stop at a predetermined position, means for rendering the position responsive means operative only when the prime mover is operating at slow speed, and manual means whereby the translating device may be operated at will at the said slow speed.

8. In a fluid power transmission the combination of a pump, a fluid motor, a circuit connecting the pump to the motor for operation of the latter, means in the circuit for controlling the fluid returning from the motor and responsive to a reduction in pressure at the discharge side of the pump for blocking the normal free return of fluid from the motor when the latter overruns the pump, and valve means shiftable to block the fluid returning from the motor independently of pressure in the pump discharge line.

9. In a fluid power transmission the combination of a pump, a fluid motor, a circuit connecting the pump to the motor for operation of the latter, means in the circuit for controlling the fluid returning from the motor and responsive to a reduction in pressure at the discharge side of the pump for blocking the normal free return of fluid from the motor when the latter overruns the pump, and valve means shiftable to block the fluid returning from the motor independently of pressure in the pump discharge line, said last valve means being also shiftable to open a path from one side of the motor to the other to thus enable the motor to be rotated with negligible resistance.

FERRIS T. HARRINGTON.
RAYMOND C. GRIFFITH.